United States Patent Office 3,254,334
Patented May 31, 1966

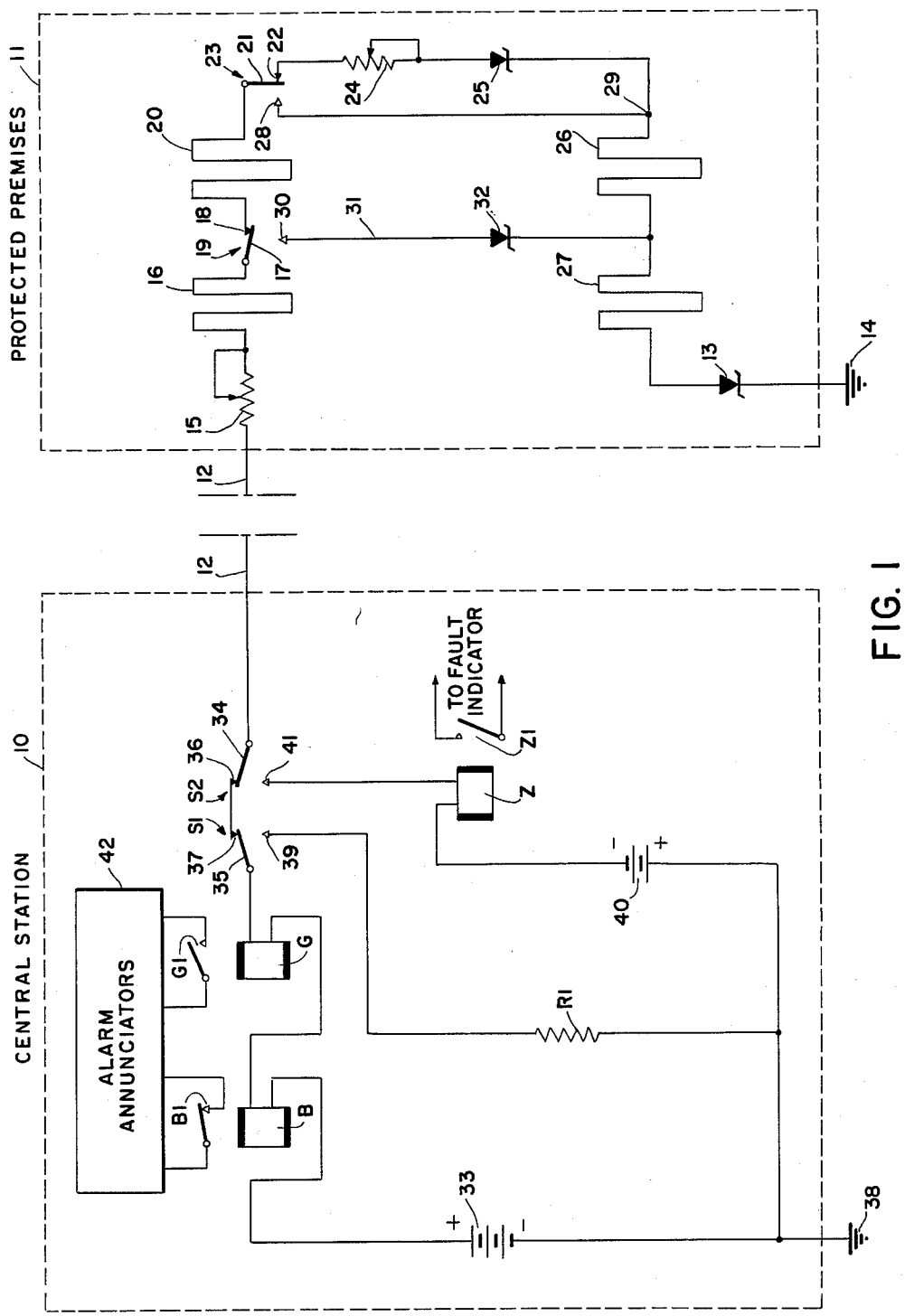
FIG. I

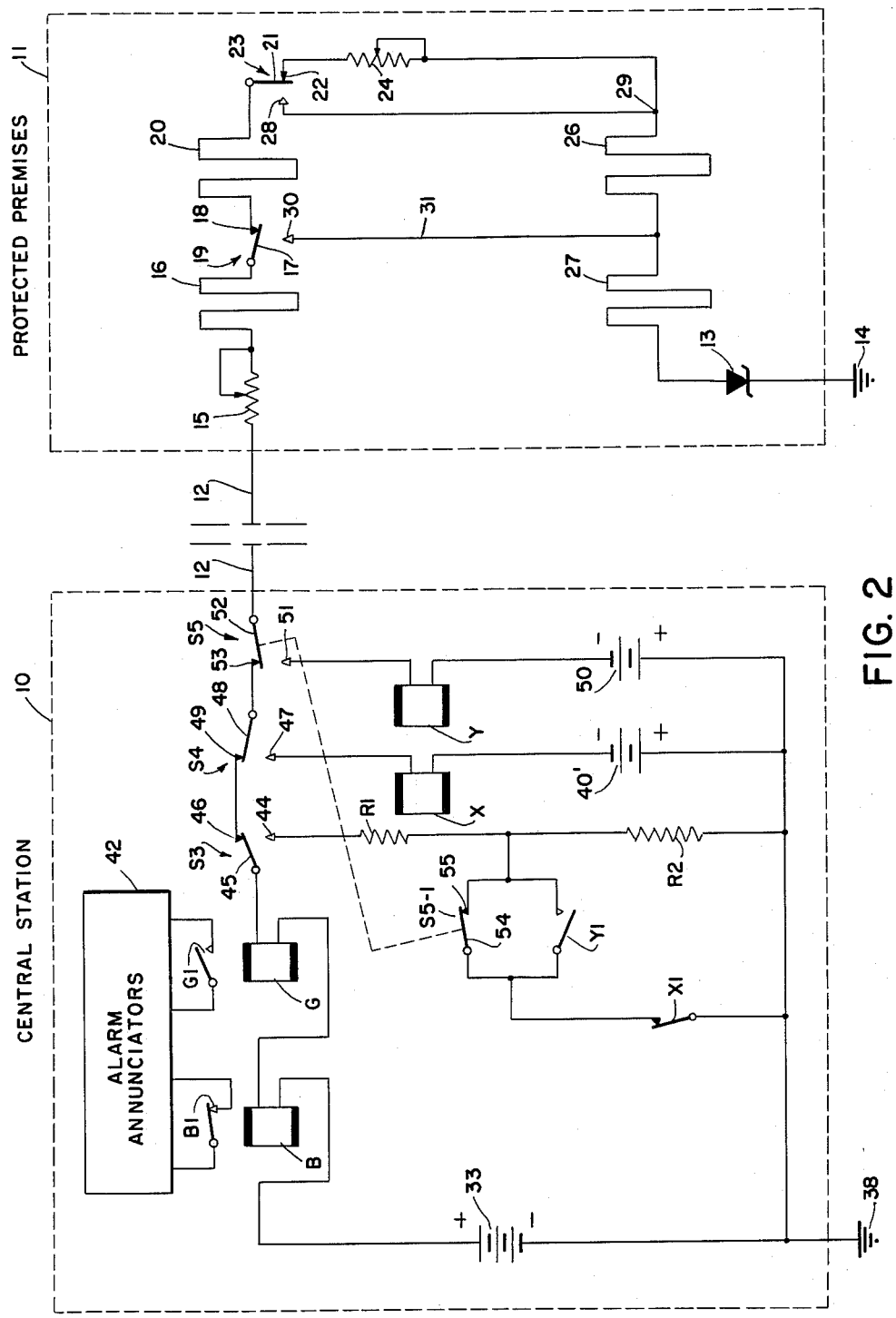

3,254,334
ELECTRICAL PROTECTION SYSTEM UTILIZING REVERSE POLARITY LINE TESTING WITH UNIDIRECTIONAL CURRENT DEVICES HAVING REVERSE BREAKDOWN CHARACTERISTIC
Lawrance H. Mitchell, Jackson Heights, N.Y., assignor to American District Telegraph Company, Jersey City, N.J., a corporation of New Jersey
Filed Dec. 19, 1963, Ser. No. 331,771
11 Claims. (Cl. 340—276)

The present invention relates to electrical protection systems and more particularly to electrical protection systems having apparatus for testing the integrity of the system.

In direct wire central station burglar alarm systems a number of protected places, e.g., factories, banks and mercantile establishments, are each connected to a central station by means of an individual conductor or pair of conductors, usually ordinary telephone lines leased for the purpose. Each of the protected premises is provided with one or more devices which detect the entry of an intruder into the protected premises and which produce an electrical signal in the corresponding line, resulting in an alarm at the central station.

Direct wire central station burglar alarm systems are customarily designed to provide an alarm signal upon a departure of a predetermined magnitude from the normal value of a supervisory current flowing through the circuit from the central station to the protected premises. Detection devices of various sorts are located at the protected premises and are so arranged as to break and/or ground the protection circuit upon being actuated by some activity of an intruder. The resulting decrease and/or increase in the normal line current is detected at the central station by a so-called "drop" which also serves to annunciate the alarm signal to the attendants at the central station.

In brief, the customary drop consists of a break detecting relay and a ground detecting relay connected in series with the line; the break relay responding to decrease in line current and the ground relay responding to line current increases. Each relay is provided with suitable contacts and auxiliary circuitry to actuate visual and audible annunciators upon line current changes of sufficient magnitude to actuate the relays. Of course, suitable electronic circuitry may be used in place of the current-sensitive relays, e.g., the solid state circuit described and claimed in the copending United States patent application of Manfred W. Muehter, Serial No. 309,761, filed September 18, 1963.

While difficult, it is at least theoretically possible for a skilled and knowledgeable intruder to compromise such burglar alarm systems by tampering with the circuit. For example, if the transmission lines could be bridged external to the protected premises through a device having approximately the characteristics of the electrical load represented by the detection apparatus comprising the internal protection circuit, an entry could be then effected to the premises without producing a signal at the central station. Under such circumstances, the device acts as a dummy load which, if it can be substituted undetected for the internal protection circuit, will permit disconnection of the actual detection apparatus from the circuit. The dummy load must obviously electrically resemble the internal circuit closely enough so that the line current will not be changed sufficiently to actuate either the break or ground relays in the central station drop.

Alternatively, it is also theoretically possible under certain conditions to ground the transmission line between the central station and the protected premises thereby negativing the effect produced upon the circuit by the operation of the protection devices at the premises. Usually this would be of significance under daytime conditions, and would be of concern particularly in connection with holdup alarms.

The principal object of the present invention has been the provision of a novel and improved electrical protection system.

More particularly, it has been been a principal object of the invention to provide a novel and improved electrical protection system having apparatus for testing the integrity of the system.

Another object of the invention has been the provision of novel and improved testing apparatus for direct wire alarm systems and particularly direct wire central station burglar alarm systems.

A further and more specific object of the invention has been the provision of circuit testing means which will detect the presence of foreign apparatus attached to the circuit for the purpose of preventing the proper operation thereof.

Still another object of the invention has been the provision of integrity testing apparatus especially adapted for use in a central station system having large numbers of protected premises connected to the central station over individual lines.

Apart from the detection of attempted tampering with protection circuits, the present invention also provides useful advance warning of impending electrical troubles in the circuit. For instance, slowly deteriorating insulation tends to cause increasing line leakage which would be detected before reaching a value sufficient to operate the ground relay in the drop. Similarly, increasing circuit resistance, indicative of dirty or corroded terminals and contacts may also be detected before the break relay is operated. The line may then be repaired while still serviceable instead of passing unnoticed to the alarm level at which time the line would be out of service until repairs could be effectuated.

A feature of the invention, therefore, has been the provision of circuit testing means which are simple, reliable and capable of detecting slow changes in circuit conditions as well as the abrupt changes caused by the attachment of a foreign device.

Other and further objects, features and advantages of the invention will appear more fully from the following description.

In accordance with the invention, one or more Zener diodes or similar fixed voltage reverse breakdown unidirectional devices are installed in the local circuit at the protected premises and are arranged to afford the desired indication of faults existing within the entire system when subjected to test voltages opposite in polarity to the normal operation potential. The principles of the invention may also be employed in conjunction with current sensing means at the central station to provide the desired determination of circuit integrity in a more economical manner where large numbers of protection circuits are to be tested.

Those skilled in the art will immediately recognize from the following description and appended drawings that the principles of the present invention may be applied with advantage to various types of electrical protection systems and to other electrical systems designed for the transmission of data over extended lines. However, as it is anticipated that the invention will find most immediate utility in central station direct wire burglar alarm systems, the invention will be described in terms of its application thereto. The description is intended for illustrative purposes only and in no manner to limit the invention.

The invention will now be described in greater detail with reference to the appended drawings, in which:

FIG. 1 is a schematic wiring diagram of a direct wire burglar alarm circuit embodying the basic principles of the invention, the circuit being shown in the normal or "night" operating condition; and FIG. 2 is a schematic wiring diagram of a modified direct wire burglar alarm circuit embodying the invention and especially adapted for economical installation in a central station having a large number of such circuits.

*Figure 1*

Referring now to FIG. 1, a central station 10 is shown connected to a protected premises 11 by a telephone line or similar direct wire connection 12. The return may be by separate wire connection or, as shown, by ground return. Typically, the line 12 may be as much as twenty miles in length and may pass through several telephone exchanges. At the protected premises 11, the line 12 is connected to a local circuit including conventional protective devices which produce break and/or ground signals and thence through a Zener diode 13 to ground at 14. The local circuit is shown in highly simplified form as comprising the series connection of a current adjusting resistor 15, a foil circuit 16, armature 17 and back contact 18 of a protection control switch 19, another foil circuit 20, armature 21 and back contact 22 of a door protection switch 23, a current adjusting resistor 24, a Zener diode 25, foil circuits 26 and 27, Zener diode 13 and thence to ground at 14. The door protection switch 23 has a front contact 28 connected to foil circuit 26 at point 29 and the protection control switch 19 has a front contact 30, which, when made with armature 17, provides a shunt through conductor 31 and diode 32 to a point between foil circuits 26 and 27 for all circuit components to the right of conductor 31.

The foil circuits 16, 20, 26, 27 may consist of conventional lead foil strip adhered to the glass panels of windows (or doors) and carry the normal supervisory current of the system. If an intruder breaks a glass panel in an effort to enter the premises, the current carrying foil will be severed and result in the production of a "break" signal at the central station. Typically, such a break signal might be represented by a decrease in current in line 12 from a normal value of 15 milliamperes to 9 milliamperes or less. A similar form of protection for walls, floors and ceilings is sometimes provided by means of foil or fine wire applied to the surfaces thereof in such manner that it will be ruptured if the surface is breached. Items 16, 20, 26, 27 of the drawings are intended to represent this form of protection regardless of whether installed on glass panels or other building structure elements.

If the door protected by the switch 23 is opened, the armature 21 will ransfer from the back contact 22 to the front contact 28 and result in the production of a brief "break" signal (while the armature 21 is in motion) followed by a "ground" signal at the central station. Typically, a ground signal might be represented by an increase in current in line 12 from the normal value to 21 milliamperes or more.

It should be understood that the actual circuit at the protected premises will usually be substantially more complex and sophisticated than the simple circuit shown and will include a far greater number of protective devices.

The other end of line 12 is coupled at the central station to the positive terminal of a source of potential 33 (which typically might be a fifty-two volt battery) through a series circuit comprising armatures 34, 35 and associated back contacts 36, 37 of test switches S2 and S1, respectively, winding G of the ground relay and winding B of the break relay. The negative terminal of the normal operation battery 33 is grounded at 38.

In parallel with the battery 33 and the coils B and G of the break and ground relays is a circuit containing a resistor R1 connected between ground 38 and front contact 39 of test switch S1. A second circuit comprising a source of potential 40 (which typically might be a nine volt battery) in series connection with the coil of a fault detection relay Z is coupled between the ground 38 and front contact 41 of test switch S2. The polarity of the test battery 40 is opposite to that of the normal operation battery 33, i.e., the positive terminal is connected to the ground 38. The fault detector relay Z has a normally open contact Z1 in a separate circuit connected to a fault indicator which might be a visual and/or audible annunciation means of conventional design which serves to alert the central station attendant upon energization of relay Z.

As previously indicated, the circuit at the protected premises will generally comprise a number of devices for the protection of doors, walls and windows. In the case of mercantile establishments particularly, it has been found convenient to shunt certain of the protective devices out of the circuit during normal business hours and thus avoid the production of alarm signals as the front door or various windows are opened in the ordinary course of business. The shunt feature is shown in the drawings as controlled by the protection control switch 19 which is operated when the premises are opened for business so that armature 17 makes with front contact 30 thereby connecting line 12 to ground 14 and removing protection devices 20, 23 and 26 from the circuit. The devices 16 and 27 remaining in the circuit ordinarily constitute the so-called "permanent" protection devices such as foil or wire protected walls, ceilings, etc.

Adjustable resistors 15 and 24 are provided at the premises to limit the current in line 12 to a selected nominal value, e.g., fifteen milliamperes, during the period while the entire protection system is in operation, usually termed the "night" period. The circuit components are so selected and adjusted that operation of a break signal device will cause the line current to fall to or below a first selected value, e.g., nine milliamperes, while operation of a ground signal device will cause the line current to rise to or above a second preselected value, e.g., twenty-one milliamperes. During the "protection off" or "day" period, the adjustments are such that the system is in the grounded condition. While specific values of currents and voltages are referred to herein for convenience in explaining the operation of the invention, it should be understood that these specific values are given by way of illustration only and are not to be construed as in any manner limiting the invention.

The break relay B at the central station is arranged to be held energized by the normal current in line 12, while the ground relay G is de-energized during the "protection on" period. A decrease in the line current to or below the first selected value will cause the break relay B to become de-energized and open the normally closed contacts B1, while an increase of line current to or above the second selected value will energize the ground relay G and close the normally open contacts G1. The contacts B1 and G1 are coupled to alarm annunciators 42 which are of conventional design and serve to provide audible and visual indication of the operation of the break and ground relays, respectively, to the attendants at the central station.

*Test operation—"protection on" condition*

During the period the entire protection system is in service, current will flow from the grounded battery 33 through the line 12 and all of the local circuit at the protected premises except conductor 31 to ground at 14. The Zener diodes 25 and 13, each of which might typically have a Zener voltage of five volts, are so connected in the circuit as to be in the conducting condition and thus present negligible resistance to the current flow.

A Zener diode, or as it is sometimes termed, an "avalanche" diode, is a unidirectional semiconductor device, which exhibits a very low resistance in the forward direction and a high resistance in the reverse direction. A Zener diode exhibits the additional property of being subject to breakdown in the reverse direction when the voltage thereacross equals or exceeds a fixed value. Hence, when the reverse voltage across a Zener diode reaches the fixed value, the diode will conduct in the reverse direction. Of course, a Zener diode has some resistance in the forward direction and the breakdown voltage is subject to some variation. But for a circuit of the type here involved the forward resistance is negligible and the breakdown voltage is substantially constant.

A Zener diode is particularly well suited to the purposes of the invention. However, other forms of apparatus may be used in place of a Zener diode. One such form of apparatus is a carbon stack voltage regulator shunted by a conventional diode, the diode being poled to pass current in the forward direction as shown for the Zener diodes in FIG. 1. Another suitable form of apparatus is a battery shunted by a diode, the diode being poled as shown in FIG. 1 and the battery being poled in the opposite direction to oppose reverse current flow in the circuit. Still another form of apparatus would be a Thermistor shunted by a diode. The Thermistor should have a moderately high cold resistance such that applied voltage in the reverse current direction must exceed the selected value, e.g., five volts, before self-heating of the Thermistor will be sufficient to lower resistance of the Thermistor and permit appreciable current flow. Yet another suitable apparatus is a Varistor shunted by a diode, the Varistor having an expontial voltage-current characteristic. A Varistor is a silicon carbide or similar semiconductor device whose resistance varies with the applied potential.

In general, these various forms of apparatus, including the Zener diode, may be described as being unidirectional current-carrying devices having a low forward resistance and a high reverse resistance except when subjected to a voltage in the reverse direction in excess of a particular breakdown value.

The present invention affords a simple and effective means whereby the central station attendant may be assured that the integrity of the protection circuits is intact in that no grounds or circuit bridges, of either accidental or intentional origin, exist which could interfere with the reception of alarm signals.

The testing of a protection circuit is effected by operating test switches S1 and S2. The transfer of armature 35 of test switch S1 from back contact 37 to front contact 39 establishes a new current path from battery 33 through the coils of break relay B and ground relay G, switch S1 and resistor R1 to ground 38. The resistor R1 should be selected to effectively duplicate the electrical load of the entire protection circuit and consequently, as there will be no change in the current flow from battery 33, the break relay B will not be released and the ground relay G will not be energized. The switch S1 may be of the make-before-break type to avoid the production of a break signal as the armature 35 transfers; however, break relays are usually provided with a brief retard to prevent false operation arising from natural line current fluctuations that will be adequate to span the switching time.

Armature 34 of switch S2 connects the test voltage source 40 to line 12 through the coil of the fault detector relay Z and front contact 41. In practice, it would be convenient to combine switches S1 and S2 into a single double pole switch.

Since the polarity of the test voltage is opposite to that of the normal voltage supply, the current flow through the protection circuit would be reversed except that the series connected Zener diodes 13 and 25, each having a Zener voltage of five volts, are now opposing current flow from the nine volt battery 40; thus there is no current flow. However, if another current path exists by reason of a ground or some circuit bridge, either or both of diodes 13 and 25 would be by-passed and current would flow through the coil of relay Z causing it to energize and close contact Z1. The closure of contact Z1 completes a conventional circuit to operate visual and/or audible indicators which annunciate the presence of a circuit fault to the attendant.

The Zener diode voltage and/or the test battery voltage may be varied for different installations to prevent inclusion of corresponding Zener diodes in a dummy circuit in order to defeat the test.

*Test operation—"protection off" condition*

As hereinabove explained, the protection system is usually modified during normal business hours by operation of the protection control switch so that some of the protective devices are shunted by the current path through conductor 31. Under these conditions, the integrity of the circuit may be tested in the same manner; the only difference being that diodes 13 and 32 now act in series instead of diodes 13 and 25. The diode 32 would normally be the equivalent of diode 25. However, those skilled in the art will recognize that diodes having different Zener voltages may be substituted for diodes 13, 25 and 32 of FIG. 1 and other voltages substituted for the test potential to produce a test procedure of any desired sensitivity and also to avoid defeat of the test procedures.

It will be further recognized that line leakage resulting from slowly deteriorating insulation or other natural causes will appear as a partial ground and thus may be detected by tests of appropriate sensitivity. While the relay G is, of course, sensitive to increases in current flow, it is not practical to adjust relay G to respond to the minor current increase resulting from a partial ground because the resulting higher sensitivity would increase the danger of spurious alarms. But the relay Z may be adjusted so as to respond to the minor current flow resulting from a partial ground. Similarly, by increasing the voltage 40, as by providing a separate battery, a potentiometer or other means, to a value slightly above the breakdown voltage of the combined Zener diodes, increased circuit resistance such as is indicative of dirty or crowded contacts and terminals may be detected. Thus if the circuit resistance is at the proper value, a voltage slightly above the combined Zener voltages will cause the Zener diodes to break down and energize relay Z. But if the circuit resistance is somewhat higher, as from corroded or dirty contacts, the current flow produced by a slightly higher voltage will be inadequate to cause relay Z to operate. In such case failure of relay Z to operate would signify a fault. As in the case of relay G, it is not practical to make relay B sufficiently sensitive to detect current changes such as result from dirty contacts and like causes since the likelihood of spurious alarms would be increased. However, relay Z can effectively be utilized for this purpose, as described.

The ability to determine and correct incipient line troubles before they progress to the point of causing false alarms or interfering with service is of great advantage in the operation of central station protection services.

*Figure 2*

The modern central station providing protection services often has many hundreds of direct wire burglar alarm circuits connected thereto. In such case the installation of the Zener diodes at each protected premises represents a considerable investment both in the cost of the diodes and the labor and difficulties of accomplishing their installation. Where large numbers of circuits are involved, the present invention may be employed in a more economical manner through the arrangement illustrated by FIG. 2 wherein like numbers are used to identify the components which are similar to those of FIG. 1.

The central station 10 is connected to the protected premises 11 by the line 12 and the local circuit within the premises 11 comprises, in series connection, the adjustable resistor 15, foil circuit 16, protection control switch 19, foil circuit 20, door protection switch 23, adjustable resistor 24, foil circuits 26 and 27, a Zener diode 13 whose Zener voltage might typically be five volts and thence to ground at 14. The door switch 23 is connected to foil contact 26 at 29 through front contact 28 when the armature 21 has been transferred. Foil circuits 20, 26, door switch 23 and resistor 24 are shunted by conductor 31 when armature 17 of protection control switch 19 is made with front contact 30. It will therefore be apparent that the local protection circuit of FIG. 2 is identical with that of FIG. 1 except for the elimination of Zener diodes 25 and 32. It should be understood, of course, that elimination of Zener diodes 25 and 32 represents a decrease in reliability or, conversely, an increase in susceptibilty to defeat. However, the danger involved is not great.

At the central station, the normal operating battery 33, whose negative terminal is grounded at 38, has the positive terminal coupled to the line 12 through the coils of break relay B and ground relay G and the normally closed test switches S3, S4 and S5. The contacts B1 and G1 of the break and ground relays respectively are connected through conventional circuitry to the alarm annunciators 42. Battery 33 and the coils B and G of the break and ground relays are paralleled by a circuit connected to ground 38 which contains series resistors R2 and R1 and terminates at front contact 44 of test switch S3. Resistor R2 is normally shunted to ground at 38 by a circuit comprising normally closed contacts X1 of a relay X in series connection with the parallel combination of normally closed switch S5–1 and normally closed contacts Y1 of a relay Y.

A second parallel circuit consists of a low voltage test battery 40' which might typically be four volts and whose positive terminal is connected to ground at 38 and whose negative terminal is coupled to front contact 47 of test switch S4 through the coil of the normally deenergized relay X. A third parallel circuit consists of a high voltage test battery 50 which might typically be nine volts and whose positive terminal is connected to ground at 38 and whose negative terminal is coupled to front contact 51 of test switch S5 through the coil of normally deenergized relay Y. It will be noted that the polarity of test batteries 40 and 50 is opposite to that of the normal operation battery 33.

The FIG. 2 arrangement in which two of the three Zener diodes provided in FIG. 1 for each of the protected premises are eliminated obviously is more economical where many hundreds of protection circuits are to be supervised. The test technique, however, is different in that two test potentials of different levels are applied to the circuit as described hereinafter.

*Test operation—"protection on" condition*

When the protection system is in the normal operating condition as shown in FIG. 2, current flows from the battery 33 through the coils B and G of the break and ground relays, the test switches S3, S4, and S5, line 12, resistor 15, foil circuit 16, back contact 18 of switch 19, foil circuit 20, switch 23, resistor 24, foil circuits 26 and 27, diode 13 and thence to ground at 14.

The central station attendant performs the circuit integrity test by first transferring test switch S3 so that armature 45 is made with front contact 44 thereby disconnecting line 12 and connecting the positive terminal of battery 33 to a new circuit to ground 38 which includes in series connection the coils B and G, switch S3, resistor R1, the contacts of switch S5–1 and contacts X1. As described in connection with FIG. 1, resistor R1 acts as a dummy load to prevent operation of the break and ground relays B and G. The attendant then operates test switch S4 thereby applying the potential of the low voltage test battery 40' to the circuit. Since the test potential is below the Zener voltage of diode 13, there should be no current flow.

On the other hand, should a ground or circuit bridge exist which effectively by-passes diode 13, current will flow and energize relay X. The consequent opening of contacts X1 removes the shunt around resistor R2 which thus becomes an additional load in the circuit and thereby causes a sufficient reduction in the current flow to operate the break relay B. The resulting operation of the alarm annunciator 42 informs the attendant that excessive line leakage exists either by reason of a foreign attachment or a partial ground.

Upon completion of the low voltage test, the attendant restores test switch S4 and operates test switch S5. Armature 52, when made with front contact 51, applies the potential of test battery 50 to the circuit while armature 54 of test switch S5–1, which is ganged to operate with switch S5, opens the shunt around resistor R2. Since the potential of test battery 50 is above the Zener voltage of diode 13, current should flow immediately to energize relay Y and close contacts Y1 thus restoring the shunt around resistor R2 and preventing operation of the break relay B. In practice, the switches S5 and S5–1 may be arranged so that armature 52 is made with front contact 51 before armature 54 of switch S5–1 opens contact 55 to avoid premature operation of break relay B although the normal retardation of relay B will ordinarily suffice to span the time of the switching operation.

If current should not flow, relay Y will remain deenergized and, since both switch S5–1 and contact Y1 are open, the resistor R2 will decrease the current flow to operate the break relay B as before. This high potential test, whose sensitivity may be selected by varying the test potential, provides the useful service of detecting increased resistance in the circuit and is indicative not only of foregin attachments but of such routine circuit troubles as dirty or corroded terminals and contacts in the protective devices at the premises or elsewhere in the circuit.

*Test operation—"protection off" condition*

With the system in the "protection off" condition, armature 17 of the protection control switch will be made with front contact 30 thereby shunting foil circuits 20 and 26, door protection switch 23 and resistor 24 out of the protection circuit. It will be noted, however, that the current flow to ground 14 is still through Zener diode 13, the only diode used with the circuit arrangement of FIG. 2, and therefore the test operation will be identical with that for the "protection on" condition.

It will be evident to those skilled in the art and conversant with the operation of central stations that, while the switching operations have been described herein as being manual to simplify the circuit explanations, it would be advantgaeous to employ relays or other devices to perform the functions automatically. For best utilization of the invention, it would be a simple matter to provide apparatus that would not only perform the test operations automatically but would also automatically apply the tests in sequence to a large number of protection circuits, reading out the results on a suitable indicator panel. Such equipment would be well within the existing state of the art.

Both FIGS. 1 and 2 illustrate the system with the normal operation battery 33 grounded at the negative terminal. Under certain circumstances, it may be preferred to ground the positive terminal, in which case it is merely necessary to reverse the polarity of the test batteries as well as the polarity of the diodes 13, 25 and 32 to practice the invention in the manner herein described.

While the invention has been described in connection with specific embodiments thereof and in specific uses, various modifications thereof will occur to those skilled in the art without departing from the spirit and scope of the invention as set forth in the appended claims.

What is claimed is:

1. In a signalling system in which one place is connected to another place by a conductive line, said other place having a first source of direct current potential coupled to said line and current-sensitive means coupled to said line to detect changes in current therein, said one place having at least one signalling device connected to said line and arranged when operated to alter the current flow in said line; the combination comprising a second source of direct current potential at said other place, means selectively to connect said second source to said line in opposite polarity to said first source and to disconnect said first source from said line, first and second unidirectional current-carrying devices each having a low forward resistance and a high reverse resistance except when subjected to a voltage in the reverse direction in excess of a particular breakdown value, means at said one place to connect said unidirectional devices in series with said line with the forward direction thereof corresponding to the current flow in said line produced by said first source, said combined particular voltage breakdown value of said unidirectional devices being greater than the voltage of said second source, the individual particular voltage breakdown valves of said unidirectional devices being less than the voltage of said second source, said unidirectional devices being electrically separated by said one signalling device, and means to detect current flow in said line when said second source is connected to said line.

2. In an electrical protection system in which a protected place is connected to a station by a conductive line, said station having a first source of direct current potential coupled to said line and current-sensitive means coupled to said line to detect changes in current therein, said protected place having at least one protective device connected to said line and arranged when operated to alter the current flow in said line; the combination comprising a second source of direct current potential at said station, means selectively to connect said second source to said line in opposite polarity to said first source and to disconnect said first source from said line, means to prevent operation of said current-sensitive means when said first source is disconnected from said line, first and second Zener diodes connected in series with said line at said protected place, the forward direction of said Zener diodes being in the direction of current flow in said line produced by said first source, the combined breakdown voltages of said Zener diode being greater than the voltage of said second source, the individual breakdown voltages of said Zener diodes being less than the voltage of said second source, said Zener diodes being electrically separated by said one protective device, and means at said station to detect current flow in said line when said second source is connected to said line.

3. In an electrical protection system in which a protected place is connected to a station by a conductive line, said station having a first source of direct current potential coupled to said line and current-sensitive means coupled to said line to detect changes in current therein, said protected place having at least one protective device connected to said line and arranged when operated to alter the current flow in said line; the combination comprising a second source of direct current potential at said station, means selectively to connect said second source to said line in opposite polarity to said first source and to disconnect said first source from said line, means to prevent operation of said current-sensitive means when said first source is disconnected from said line, a Zener diode connected in series with said line at said protected place, the forward direction of said Zener diode being in the direction of current flow in said line produced by said first source, the breakdown voltage of said Zener diode being greater than the voltage of said second source, means at said station to detect current flow in said line when said second source is connected to said line, a source of a third direct current potential greater than the potential of said second source, means selectively to connect said third source to said line in place of said first and second sources, said third source having a voltage sufficiently large and of the proper polarity to cause said Zener diode to conduct in the reverse direction and produce current flow in said line, and means at said station to detect current flow in said line when said third source is connected to said line.

4. In a central station burglar alarm system in which a protected place is connected to a central station by a conductive line, said central station having a first source of direct current potential coupled to said line to cause a supervisory current to flow through said line in a forward direction and separate break and ground detecting devices coupled in series with said line to detect predetermined increases and decreases, respectively, in current in said line relative to said supervisory current, said protected place having a plurality of protection devices coupled in series with said line; the combination comprising:

(a) a second source of direct current potential at said central station;
(b) switching means selectively to couple said second source to said line in opposite polarity to said first source and to disconnect said first source and said detection devices from said line;
(c) a dummy load at said central station having a resistance substantially equal to the normal resistance of said line;
(d) means selectively to couple said dummy load to said first source and to said break and ground detecting devices when the latter are disconnected from said line thereby to prevent operation of said detection devices upon current changes in said line;
(e) first and second Zener diodes at said protected place, said first Zener diode being connected in series with said line between the last of said protection devices and the current return path of said line, said second Zener diode being interposed between selected ones of said protection devices, said Zener diodes being poled with their forward directions corresponding to said forward direction of supervisory current flow in said line, the individual breakdown voltages of said first and second Zener diodes each being less than the voltage of said second source and the combined breakdown voltages of said first and second Zener diodes being greater than the voltage of said second source;
(f) and means at said central station to detect a current flow in said line when said second source is coupled to said line.

5. An electrical protection system as set forth in claim 4, comprising a third source of direct current potential at said central station and means selectively to couple said third source to said line in place of said first and second sources, said third source having a voltage sufficiently large and of the proper polarity to cause said Zener diodes to conduct in the reverse direction and produce current flow in said line.

6. In a central station burglar alarm system in which a protected place is connected to a central station by a conductive line, said central station having a first source of direct current potential coupled to said line to cause a supervisory current to flow through said line in a forward direction and separate break and ground detecting devices coupled in series with said line to detect predetermined increases and decreases, respectively, in current in said line relative to said supervisory current; said protected place having a plurality of permanent protection devices coupled in series with said line, a plurality of other protection devices coupled in series with each other and with said line, said other protection devices forming an electrically contiguous series circuit, a shunt path and selectively operable means to disconnect said other protection devices from said line and to couple said shunt path to said line in place of said other protection devices; the combination comprising:
(a) a second source of direct current potential at said central station;
(b) switching means selectively to couple said second source to said line in opposite polarity to said first source and to disconnect said first source and said detection devices from said line;
(c) a dummy load at said central station having a resistance substantially equal to the normal resistance of said line;
(d) means selectively to couple said dummy load to said first source and to said break and ground detecting devices when the latter are disconnected from said line thereby to prevent operation of said detection devices upon current changes in said line;
(e) first, second and third Zener diodes at said protected place, said first Zener diode being connected in series with said line between the last of said protective devices and the current return path of said line, said second Zener diode being interposed in said electrically contiguous series circuit, said third Zener diode being interposed in said shunt path, said Zener diodes being poled with their forward directions corresponding to said forward direction of supervisory current flow in said line, the individual breakdown voltages of said first, second and third Zener diodes each being less than the voltage of said second source and the combined breakdown voltages of said first and second Zener diodes and the combined breakdown voltages of said first and third Zener diodes each being greater than the voltage of said second source;
(f) and means at said central station to detect a current flow in said line when said second source is coupled to said line, said last mentioned means comprising a relay having an operating coil connected in series with said second source.

7. In a central station burglar alarm system in which a protected place is connected to a central station by a conductive line, said central station having a first source of direct current potential coupled to said line to cause a supervisory current to flow through said line in a forward direction and separate break and ground detecting devices coupled in series with said line to detect predetermined increases and decreases, respectively, in current in said line relative to said supervisory current; said protected place having a plurality of protection devices coupled in series with said line; the combination comprising:
(a) a second source of direct current potential at said central station;
(b) first switching means selectively to couple said second source to said line, said second source being poled to apply a voltage to said line in a sense tending to produce a current flow therein in a direction opposite to said supervisory current;
(c) a third source of direct current potential at said central station;
(d) second switching means selectively to couple said third source to said line, said third source being poled to apply a voltage to said line in a sense tending to produce a current flow therein in a direction opposite to said supervisory current;
(e) first and second current responsive means connected in series with said second and third sources respectively;
(f) first normally closed contacts arranged to be opened in response to appreciable current flow through said first current responsive means;
(g) normally open contacts arranged to be closed in response to appreciable current flow through said second current responsive means;
(h) third switching means having second normally closed contacts arranged to be opened when said second switching means is operated to couple said third source to said line;
(i) first and second series connected resistive elements at said central station, said first resistive element having a resistance value substantially equal to the normal resistance of said line and the series combination of said resistive elements having a resistance value greater than that of said line with break current flowing therein;
(j) fourth switching means selectively to disconnect said first source and said detecting devices from said line and substantially simultaneously to connect said first source, said detecting devices and said resistive elements in series;
(k) a shunt circuit for said second resistive device comprising the parallel combination of said normally open contacts and said second normally closed contacts of said third switching means in series with said first normally closed contacts; and
(l) a Zener diode at said protected place connected in series with said line and said protective devices, said Zener diode being poled with its forward direction corresponding to said forward direction of supervisory current flow in said line, the breakdown voltage of said Zener diode being greater than the voltage of said second source, said breakdown voltage of said Zener diode being less than the voltage of said third source.

8. In a central station burglar alarm system in which a protected place is connected to a central station by a conductive line, said central station having a first source of direct current potential coupled to said line to cause a supervisory current to flow through said line in a forward direction and separate break and ground detecting devices coupled in series with said line to detect predetermined increases and decreases, respectively, in current in said line relative to said supervisory current; said protected place having a plurality of permanent protection devices coupled in series with said line, a plurality of other protection devices coupled in series with each other and with said line, said other protection devices forming an electrically contiguous series circuit, a shunt path and selectively operable means to disconnect said other protection devices from said line and to couple said shunt path to said line in place of said other protection devices; the combination comprising:
(a) a second source of direct current potential at said central station;
(b) first switching means selectively to couple said second source to said line in opposite polarity to said first source and to disconnect said first source and said detection devices from said line;
(c) a third source of direct current potential at said central station;
(d) second switching means selectively to couple said third source to said line in opposite polarity to said first source and to disconnect both of said first and second sources and said detection devices from said line;
(e) first and second relays each having an operating coil connected in series with said second and third sources respectively, said first relay having a set of back contacts and said second relay having a set of front contacts, said relays being energized to transfer the respective contacts thereof upon appreciable current flow in the respective coils thereof;
(f) third switching means having normally closed contacts arranged to be opened when said second switching means is operated to couple said third source to said line;
(g) first and second series connected resistive elements at said central station, said first resistive element having a resistance value substantially equal to the normal resistance of said line and the series combination of said resistive elements having a resistance value greater than that of said line with break current flowing therein;

(h) fourth switching means selectively to disconnect said first source and said detecting devices from said line and substantially simultaneously to connect said first source, said detecting devices and said resistive elements in series;

(i) a shunt circuit for said second resistive device comprising the parallel combination of said front contacts of said second relay and said normally closed contacts of said third switching means in series with said back contacts of said first relay; and (j) a Zener diode at said protected place connected in series with said line between the current return path thereof and the last of said protective devices, said Zener diode being poled with its forward direction corresponding to said forward direction of supervisory current flow in said line, the breakdown voltage of said Zener diode being greater than the voltage of said second source, said breakdown voltage of said Zener diode being less than the voltage of said third source.

9. In a signalling system in which one place is connected to another place by a conductive line, said other place having a first source of direct current potential coupled to said line and current-sensitive means coupled to said line to detect changes in current therein, said one place having at least one signalling device connected to said line and arranged when operated to alter the current flow in said line; the combination comprising a second source of direct current potential at said other place, means selectively to connect said second source to said line in opposite polarity to said first source and to disconnect said first source from said line, first and second unidirectional current-carrying devices each having a low forward resistance and a high reverse resistance except when subjected to a voltage in the reverse direction in excess of a particular breakdown value, means at said one place to connect unidirectional devices in series with said line with the forward directions thereof corresponding to the current flow in said line produced by said first source, the individual voltage breakdown values of said unidirectional devices each being less than the voltage of said second source and the combined voltage breakdown values of said unidirectional devices being greater than the voltage of said second source, and means to detect current flow in said line when said second source is connected to said line.

10. In a signalling system in which one place is connected to another place by a conductive line, said other place having a first source of direct current potential coupled to said line and current-sensitive means coupled to said line to detect changes in current therein, said one place having at least one signalling device connected to said line and arranged when operated to alter the current flow in said line; the combination comprising a second source of direct current potential at said other place, means selectively to connect said second source to said line in opposite polarity to said first source and to disconnect said first source from said line, first and second unidirectional current-carrying devices each having a low forward resistance and a high reverse resistance except when subjected to a voltage in the reverse direction in excess of a particular breakdown value, means at said one place to connect said unidirectional devices in series with said line with the forward directions thereof corresponding to the current flow in said line produced by said first source, the individual voltage breakdown values of said unidirectional devices each being less than the voltage of said second source and the combined voltage breakdown values of said unidirectional devices being greater than the voltage of said second source, means to detect current flow in said line when said second source is connected to said line, a source of a third direct current potential, means selectively to connect said third source to said line in place of said first and second sources, said third source having a voltage sufficiently large and of the proper polarity to cause said unidirectional devices to conduct in the reverse direction and produce current flow in said line, and means to detect current flow in said line when said third source is connected to said line.

11. In an electrical protection system in which a protected place is connected to a station by a conductive line having a ground return, said station having a first source of direct current potential coupled to said line and current-sensitive means coupled to said line to detect changes in current therein, said protected place having a plurality of protective devices connected in series in said line and arranged when operated to alter the current flow in said line; the combination comprising a second source of direct current potential at said station, means selectively to connect said second source to said line in opposite polarity to said first source and to disconnect said first source from said line, means to prevent operation of said current-sensitive means when said first source is disconnected from said line, a pair of Zener diodes connected in series with said line at said protected place, the forward direction of said zener diodes being in the direction of current flow in said line produced by said first source, the individual breakdown voltages of said Zener diodes each being less than the voltage of said second source and the combined breakdown voltages of said Zener diodes being greater than the voltage of said second source, said Zener diodes being electrically separated by at least one of said protective devices and one of said Zener diodes being connected electrically directly to said ground return, and means at said station to detect current flow in said line when said second source is connected to said line.

References Cited by the Examiner

UNITED STATES PATENTS 2,052,057  8/1936  Reid.

NEIL C. READ, *Primary Examiner.*

R. M. GOLDMAN, *Assistant Examiner.*